United States Patent [19]

Palmer et al.

[11] 4,188,966

[45] Feb. 19, 1980

[54] WALKING SUPPORT DEVICE

[76] Inventors: Oakley B. Palmer, 8733 Nada St., Downey, Calif. 90242; Russell M. Lett, 790 Wellesley Dr., Claremont, Calif. 91711

[21] Appl. No.: 948,396

[22] Filed: Oct. 4, 1978

[51] Int. Cl.[2] ........................ F16M 13/08; A61H 3/04

[52] U.S. Cl. ........................................ 135/67; 297/5; 272/70.3

[58] Field of Search ............................ 135/67; 297/5; 272/70.3, 70.4

[56] References Cited

U.S. PATENT DOCUMENTS

| | | | |
|---|---|---|---|
| 1,307,058 | 6/1919 | McGrath | 135/67 |
| 1,471,749 | 10/1923 | Monroe | 297/5 |
| 2,459,066 | 1/1949 | Duke | 297/5 |
| 2,991,485 | 7/1961 | Schulte | 272/70.3 |
| 3,189,345 | 6/1965 | Simpson | 272/70.4 |
| 3,394,933 | 7/1968 | Benoit | 272/70.4 |
| 3,488,088 | 1/1970 | Goldberg | 297/5 |
| 3,999,228 | 12/1976 | Thomas | 297/5 |
| 4,068,857 | 1/1978 | Karlsson | 297/5 |

*Primary Examiner*—Reinaldo P. Machado
*Attorney, Agent, or Firm*—William C. Babcock

[57] ABSTRACT

An adjustable walking support device adapted to restrain an infant or an invalid in an upright position and including a wheeled carriage through which the feet of the supported person descend to contact the ground. The support device itself includes a T-shaped seat bar cantilevered from one edge of a hinged parallelogram, the parallelogram including an internally directed spring for biasing the alignment thereof. Included further in the parallelogram and extending diagonally across the pivots thereof is a hydraulic strut for controlling the rate of descent or ascent of the seat support. Deployed above the seat support, once more in cantilever, is a U-shaped bracket for restraining the torso of the user. This same device may include, in alignment above the bracket and the seat support, a head support fixture, thus providing for control over the body alignment of incapacitated patients.

6 Claims, 8 Drawing Figures

FIG. 1
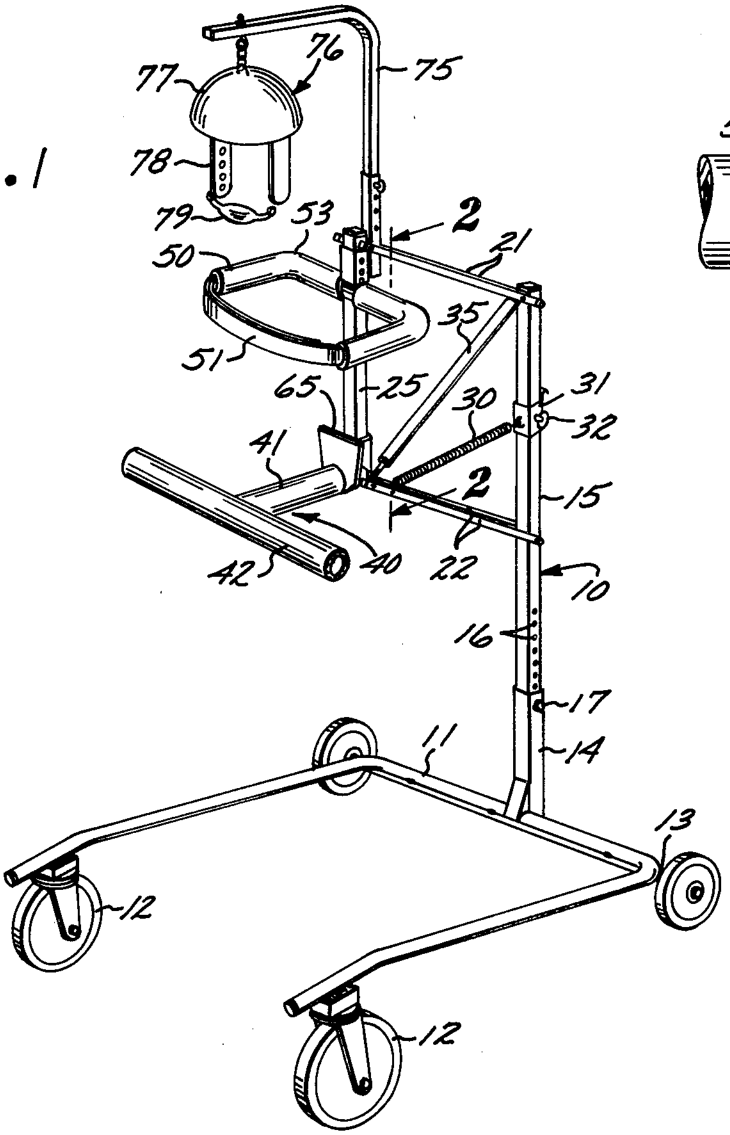
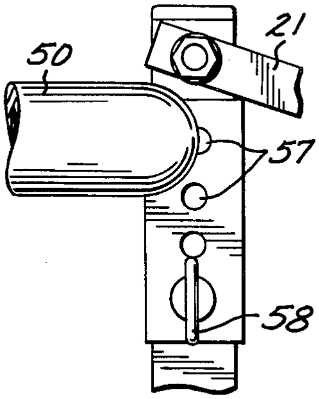
FIG. 8
FIG. 3
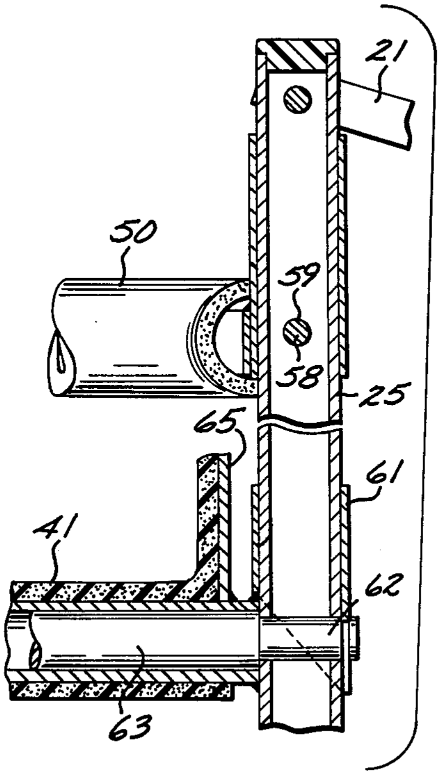
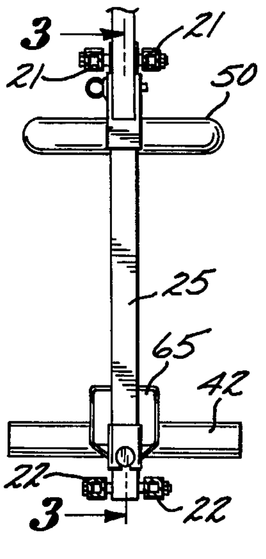
FIG. 2

FIG. 4
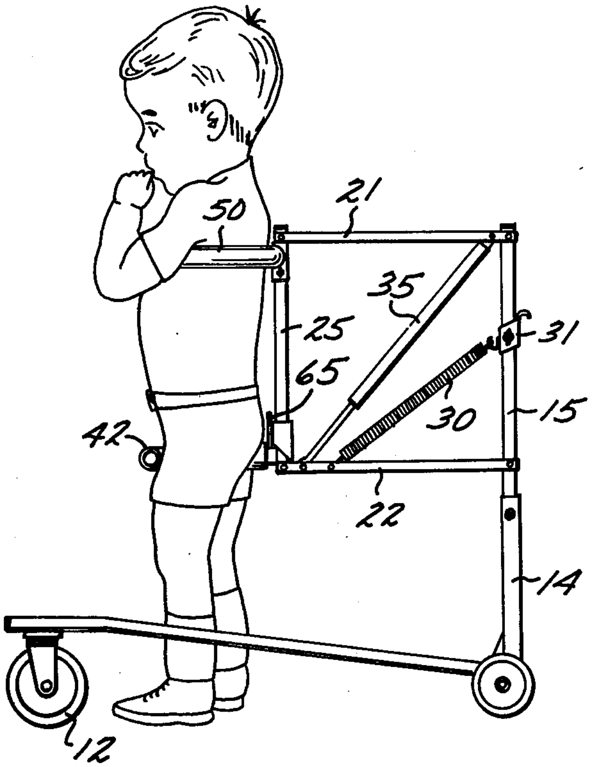
FIG. 6
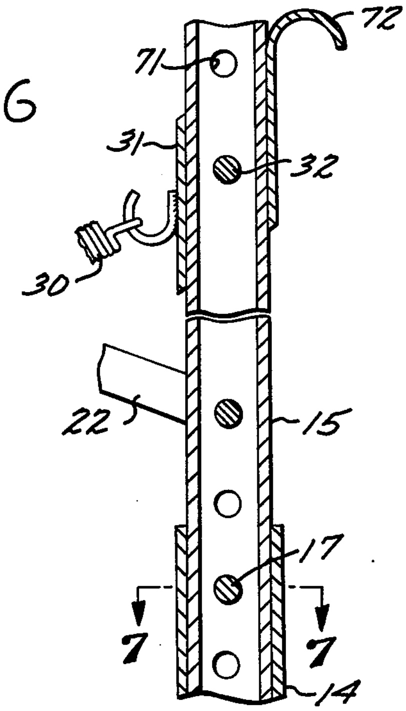
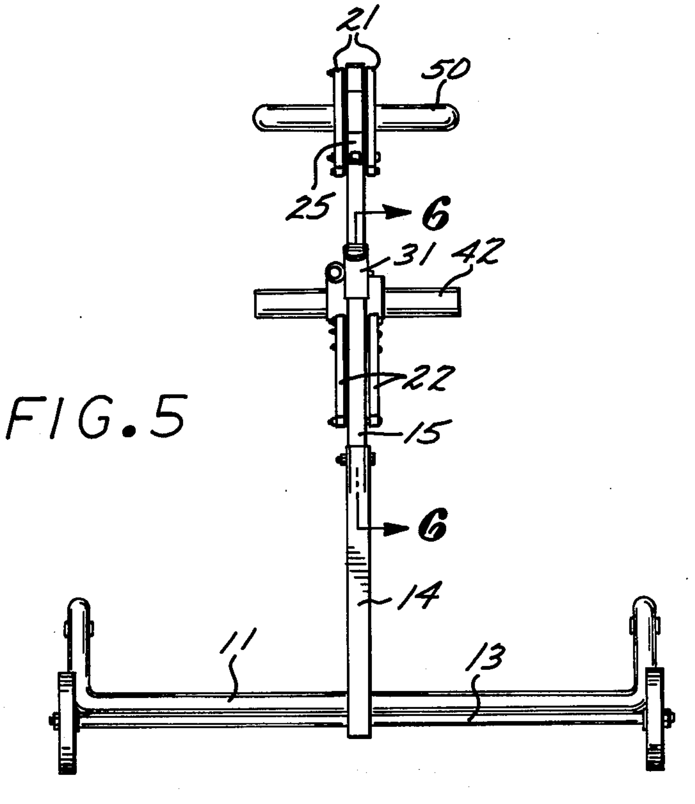
FIG. 5
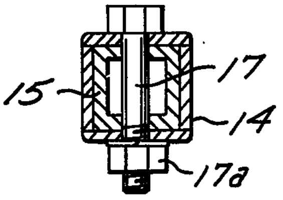
FIG. 7

WALKING SUPPORT DEVICE

BACKGROUND OF THE INVENTION

1. Field of the Invention

The present invention relates to body support devices, and more particularly in wheeled carriages used in training infants or incapacitated persons to achieve walking facility.

2. Description of the Prior Art

Strollers or other mobile devices for training an infant to walk have been known in the past. Similarly walkers or other movable support structures have been known in the past to assist an invalid both during the course of rehabilitation and in the course of walking thereafter. Typically structures of the foregoing kind did not provide the support for the torso of the invalid or infant and were therefore limited in use thereof to those persons having control over their body. Quite often, however, and with regrettable frequency, deterioration both as result of genetic anomalies and disease occurs where the patient looses control over his torso. Most such diseases are related to the nervous system with the attendant loss of substantially all coherency and the danger of injury unless restrained. Quite often, however, such diseases can be treated or at least can be partly corrected by therapy, where the therapy in the past was most frequently done on the premises of a hospital. Thus, various training or therapeutic devices have been also developed in the past, most frequently of the stationary form such as parallel bars or other gymnastic devices. These stationary features of the prior art therapeutic devices precluded the extensive use thereof by a patient away from the hospital and furthermore precluded the extension thereof into the everyday life of the disabled person.

SUMMARY OF THE INVENTION

Accordingly, it is the general purpose and object of the present invention to provide an adjustable restraining device which supports a patient in a substantially upright position, and which furthermore is transportable with the walking motion of the patient.

Yet other objects of the invention are to provide a restraining device which, depending on the tension therein, will produce varying amounts of support.

Yet additional objects of the invention are to provide a restraining device which is adapted for use by persons of various sizes.

Briefly these and other objects are accomplished within the present invention by providing a wheeled platform generally shaped as a "U", the central member of the "U" being connected to a vertical mount extending therefrom in cantilever. Received on the vertical mount, in adjustable sliding translation, is a vertical support member connected proximate the other end to two pivotal arms forming a parallelogram. The other ends of the pivotal arms are, in turn, pivotally connected to a support assembly comprising a vertical element joined at either end to the pivotal arm, the vertical element being connected to a cantilevered seat support at one end and to a U-shaped torso restraining bracket at the other end. The vertical element furthermore includes an attachment fixture for receiving an L-shaped head support brace having suspended therefrom a head restraining fixture.

By virtue of the foregoing arrangement of parts the support assembly may be aligned to a desired height relative the U-shaped bracket forming the rolling platform and in this position may be tensioned by a spring running across the parallelogram.

Furthermore, the parallelogram may include a diagonal damping strut which, by virtue of its damping rate, will isolate the motion of the parallelogram from the relatively fast motion of the patient restrained therein. Thus the support assembly will provide the necessary restraint for maintaining the patient upright, while at the same time allowing for some freedom of motion to permit the patient to walk while so supported.

By virtue of the foregoing parts a restraining device is formed which is fully adapted to support persons of various sizes and which furthermore can be tensioned to various levels of support force.

BRIEF DESCRIPTION OF THE DRAWINGS

FIG. 1 is a perspective illustration of an inventive walking support device constructed according to the present invention;

FIG. 2 is a detailed view taken along the line 2—2 of FIG. 1;

FIG. 3 is a sectional view taken along the line 3—3 of FIG. 2;

FIG. 4 is a side view illustrating the inventive device adjusted to retain an infant;

FIG. 5 is a rear view of the device shown in FIGS. 1 and 4 adjusted to support the infant;

FIG. 6 is a detailed view in section taken along line 6—6 of FIG. 5;

FIG. 7 is a sectional end view of a sliding support arrangement taken along line 7—7 of FIG. 6; and FIG. 8 is a detail view in section illustrating the alignment and adjusting features useful herein.

DESCRIPTION OF THE PREFERRED EMBODIMENT

As shown in FIG. 1 an adjustable walking support device, generally designated by the numeral 10, comprises a U-shaped wheeled platform 11 provided with pivoted casters 12 at the free ends of the legs thereof and a wheeled axle 13 adjacent the central element of the frame. Extending vertically from the central element is a rectangular mount 14 having received therein, in sliding translation, a rectangular support member 15. Member 15 is provided with a plurality of transverse bores or openings 16 for receiving a pin 17 extending across the opening of the support bracket 14. Thus by the appropriate selection of opening 16, various height deployments of the support member 15 can be made, thus adapting to the various physical sizes of the person retained therein.

Connected pivotally to the free end of the support member 15 and articulated in pivotal motion towards the interior of the "U" of the support frame 11 is a first pivotal element 21 of a length substantially equal to a second pivotal element 22 pivoted from a point along the length of the support member 15. Elements 21 and 22 are of equal length and engage at the free ends thereof, once more in pivotal engagement, a vertical support brace 25 forming the spine of a support assembly to be described. In this manner a parallelogram is formed by way of elements 21 and 22 and the member 25 which is biased to a selected level of angular alignment by a spring 30 deployed between the free end of element 22 and sliding collar 31 attached to the support member 15. Collar 31 is attached to member 15 at various points therealong by way of an attachment fitting 32 extending through the common interior. Extending further within the parallelogram formed by elements 21 and 22 is a hydraulic strut 35, strut 35 being aligned to extend from the free end of element 22 and the pivot of element 21 with member 15. Thus, strut 35 provides a damping feature controlling the rate at which elements 21 and 22 are pivoted.

The foregoing parallelogram deploys the abovementioned spine member 25 at various levels above the rolling surface of wheels 12 and 13. Concurrently, deployed from the lower end of member 25 and extending forwardly therefrom, is a T-shaped support platform 40 comprising a cantilevered tubular projection 41 terminating in a horizontal tubular cross-bar 42 at the free end thereof. The seat support 40 is enclosed in a sheath of polyurethane foam 43, the tubular dimensions and the thickness of the foam being selected to provide the necessary distribution of load to ensure comfort.

As shown in FIGS. 2, 3 and 4, and with particular reference to FIG. 1, the same spine member 25 furthermore is secured to a U-shaped retaining brace 50 deployed adjustably to extend over the plane of the seat support 40. The free ends of the U-shaped support brace 50 are joined by a strap 51 to surround the torso of the patient, strap 51 including an inner foam liner 52 and brace 50 being similarly sheathed in a foam envelope 53.

To achieve the foregoing vertical adjustment of the U-shaped support brace 50, the attachment thereof to member 25 is by way of a rectangular collar 56 from which the brace is extended in cantilever. More specifically as shown in FIGS. 3 and 8, the rectangular collar 56 includes a plurality of transverse openings 57 conformed to receive a pin 58 which concurrently extends through a bore 59 in the spine member 25. The seat support 40 is similarly attached to a vertically aligned rectangular collar 61 pinned to member 25 by a pin 62 which extends into the interior of the tubular seat section 41 by way of an enlarged cylindrical end 63. Proximate the collar 61, the tubular support 41 is provided with a vertically aligned plate 65, once more covered by foam covering, plate 65 providing the necessary lower back support for the user of the assembly.

As set out above, the spring tension and therefore the height of unloaded deployment of the seat support 40 can be adjusted by way of the sliding translation of collar 31 around the vertical support member 15. More specifically as shown in FIG. 6 support member 15 includes a plurality of transverse openings 71 and collar 31 is provided with a bent-over finger tab 72 on the surface opposite to the connection of spring 30. Thus collar 31 may be pulled up to align the fastener 32 thereof with the next opening 71, raising the pivotal alignment of the parallel elements 21 and 22 to the desired force level against the seat of the patient. Similarly the height adjustment of the vertical support member 15 is achieved by selective insertion of the fastener or pin 17, pin 17 according to the illustration in FIG. 7 being conformed as a bolt to provide the necessary securing features thereof. It is to be understood that alternative manners of securing can be utilized, as for example the use of a cotterpin instead of the nut 17*a* shown herein.

By virtue of the foregoing arrangement of parts various levels of deployment can be achieved, the necessary spring bias on the seat being provided by the deployment of collar 31. Should the patient require further support for his upper torso or for his head, the foregoing device is further provided with an L-shaped brace 75 adjustably extending from the upper end of the spine member 25 and aligned over the seat support. Deployed from the free end of the L-shaped brace 75 in swinging suspension therefrom is a head support fixture 76 comprising a hemispherical shell 77 provided with two downwardly directed straps 78 which at the lower ends thereof are joined by a chin strap 79. Thus, support is provided for the user's head while the U-shape frame surrounds the upper torso. The patient is placed onto the seat support 40 with the transverse bar 42 extending across the frontal surface of his thighs. In this manner an opposing force is applied to the front surfaces of the upper leg portion keeping the knees relatively straight. As the leg manipulations are made in order to achieve walking the concurrent raising of the torso permits a forward swing of the leg. In this manner all the necessary constraints to keep a relatively disabled person upright are provided allowing for the necessary therapeutic exercises in order to achieve recovery.

Obviously many modifications and variations to the above disclosure can be made without departing from the spirit of the invention. It is therefore intended that the scope of the invention be determined solely on the claims appended hereto.

What is claimed is:

1. A walking support device for restraining the body of a person in an upright position comprising:

a U-shaped support frame mounted on casters for horizontal translation on ground;

an adjustable frame member connected to said frame proximate the center of the middle element thereof;

a pivotally joined parallelogram structure connected to said frame member for pivotal articulation over the opening in said U-shaped frame;

spring biasing means connected between said parallelogram structure and said frame member for biasing thereof to a preselected deployment;

seat support means connected to said parallelogram structure and deployed to extend in cantilever therefrom; and a U-shaped torso brace connected to said parallelogram structure above said seat support means, said brace being conformed to surround the upper torso of said person.

2. Apparatus according to claim 1 wherein:

said seat support means comprises a first tubular element extending horizontally from said parallelogram structure, a second tubular element connected to the free end of said first element and extending transversely thereacross; and sheath means of flexible foam material surrounding said first and second elements.

3. Apparatus according to claim 2 wherein:

said U-shaped torso brace includes a strap extending thereacross and flexible foam covering attached to said strap.

4. Apparatus according to claim 1 wherein:

said spring biasing means includes adjusting means for manual adjustment of said preselected deployment.

5. Apparatus according to claim 1 further comprising:

damping means connected across said spring means for controlling the rate of motion of said parallelogram structure.

6. Apparatus according to claim 1 further comprising:

head support means deployed on said parallelogram structure above said torso brace for adjustably supporting the head of said person.

* * * * *